US010963853B2

(12) United States Patent
Kumra et al.

(10) Patent No.: US 10,963,853 B2
(45) Date of Patent: Mar. 30, 2021

(54) UNIFIED PAYMENT INTERFACE PREFERENCE MONITORING SERVICE CAPABLE OF INTEGRATION INTO MERCHANT SITES

(71) Applicant: Amazon Technologies, Inc., Seattle, WA (US)

(72) Inventors: Rohit Kumra, New Delhi (IN); Prashanth Shetty, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 756 days.

(21) Appl. No.: 15/081,238

(22) Filed: Mar. 25, 2016

(65) Prior Publication Data

US 2017/0278084 A1 Sep. 28, 2017

(51) Int. Cl.
*G06Q 20/02* (2012.01)
*G06Q 20/12* (2012.01)
(Continued)

(52) U.S. Cl.
CPC .......... *G06Q 20/12* (2013.01); *G06Q 20/02* (2013.01); *G06Q 20/227* (2013.01); *G06Q 20/405* (2013.01)

(58) Field of Classification Search
CPC ........ G06Q 40/00; G06Q 40/02; G06Q 20/10; G06Q 20/102; G06Q 20/40; G06Q 30/04; G06Q 30/06
(Continued)

(56) References Cited

U.S. PATENT DOCUMENTS 9,639,873 B2 * 5/2017 Zamer ................ G06Q 30/0605
2002/0033416 A1 * 3/2002 Gerszberg ........... H04M 19/001
235/380
(Continued)

FOREIGN PATENT DOCUMENTS

EP 1622351 A1 2/2006
JP 2001-338167 12/2001
(Continued)

OTHER PUBLICATIONS

International Search Report dated May 4, 2017, PCT International Application No. PCT/US2017/021792, filed Mar. 10, 2017.
(Continued)

*Primary Examiner* — Hani M Kazimi
(74) *Attorney, Agent, or Firm* — Knobbe, Martens, Olson & Bear, LLP

(57) ABSTRACT

A system is disclosed that monitors payment transactions of users across participating merchant sites, and that uses this information to determine payment service preferences of particular users. When a user initiates a checkout transaction on a merchant site, the system uses this preference information to attempt to identify a payment service that is both supported by the merchant site and preferred by the user. One of the methods includes receiving a request from a content server associated with a merchant site for a preferred option associated with a user, the request including information indicative of the user. Information describing options associated with the user are accessed, and the accessed information and information identifying options accepted by the merchant site are used to determine a preferred option. Information identifying the preferred option is provided to the content server.

20 Claims, 6 Drawing Sheets

(51) Int. Cl.
*G06Q 20/22* (2012.01)
*G06Q 20/40* (2012.01)

(58) Field of Classification Search
USPC .................................................. 705/39–42
See application file for complete search history.

(56) References Cited

U.S. PATENT DOCUMENTS

| | | |
|---|---|---|
| 2008/0183593 A1 | 7/2008 | Dierks |
| 2013/0024371 A1* | 1/2013 | Hariramani .......... G06Q 20/384 |
| | | 705/41 |
| 2013/0211934 A1 | 8/2013 | Balasubramanian |
| 2014/0114777 A1 | 4/2014 | Guyot |
| 2014/0249999 A1* | 9/2014 | Johnson ............. G06Q 20/0855 |
| | | 705/39 |
| 2014/0278965 A1 | 9/2014 | Douglas et al. |
| 2015/0012425 A1 | 1/2015 | Mathew |
| 2015/0142640 A1 | 5/2015 | Kneen |

FOREIGN PATENT DOCUMENTS

| | | |
|---|---|---|
| JP | 2002-109434 | 4/2002 |
| JP | 2007-280063 | 10/2007 |
| JP | 2008-112326 | 5/2008 |
| JP | 2008-204151 | 9/2008 |

OTHER PUBLICATIONS

International Search Report and Written Opinion for International Application No. PCT/US2017/021792 dated Oct. 4, 2018, in 7 pages.
Notice of Allowance, dated Nov. 5, 2019, in Japanese Patent Application No. 2019-500222.

* cited by examiner

UNIFIED PAYMENT INTERFACE PREFERENCE MONITORING SERVICE CAPABLE OF INTEGRATION INTO MERCHANT SITES

BACKGROUND

Given the increasing prevalence of consumer purchases on the Internet, companies have started acting as payment proxies for merchant web pages. These payment proxies enable the merchant to provide a secure payment platform that is separated from their own servers, and provide consumers of the merchant web pages with an added degree of trust that the consumers' payment credentials are safe. Since the payment proxies effect the transfer of money from a consumer to a merchant outside of servers controlled by the merchant, consumers are more likely to purchase products from small, or little known, merchants that do not have widely known reputations for security.

BRIEF DESCRIPTION OF THE DRAWINGS

Like reference numbers and designations in the various drawings indicate like elements.

DETAILED DESCRIPTION

Figure 1A:
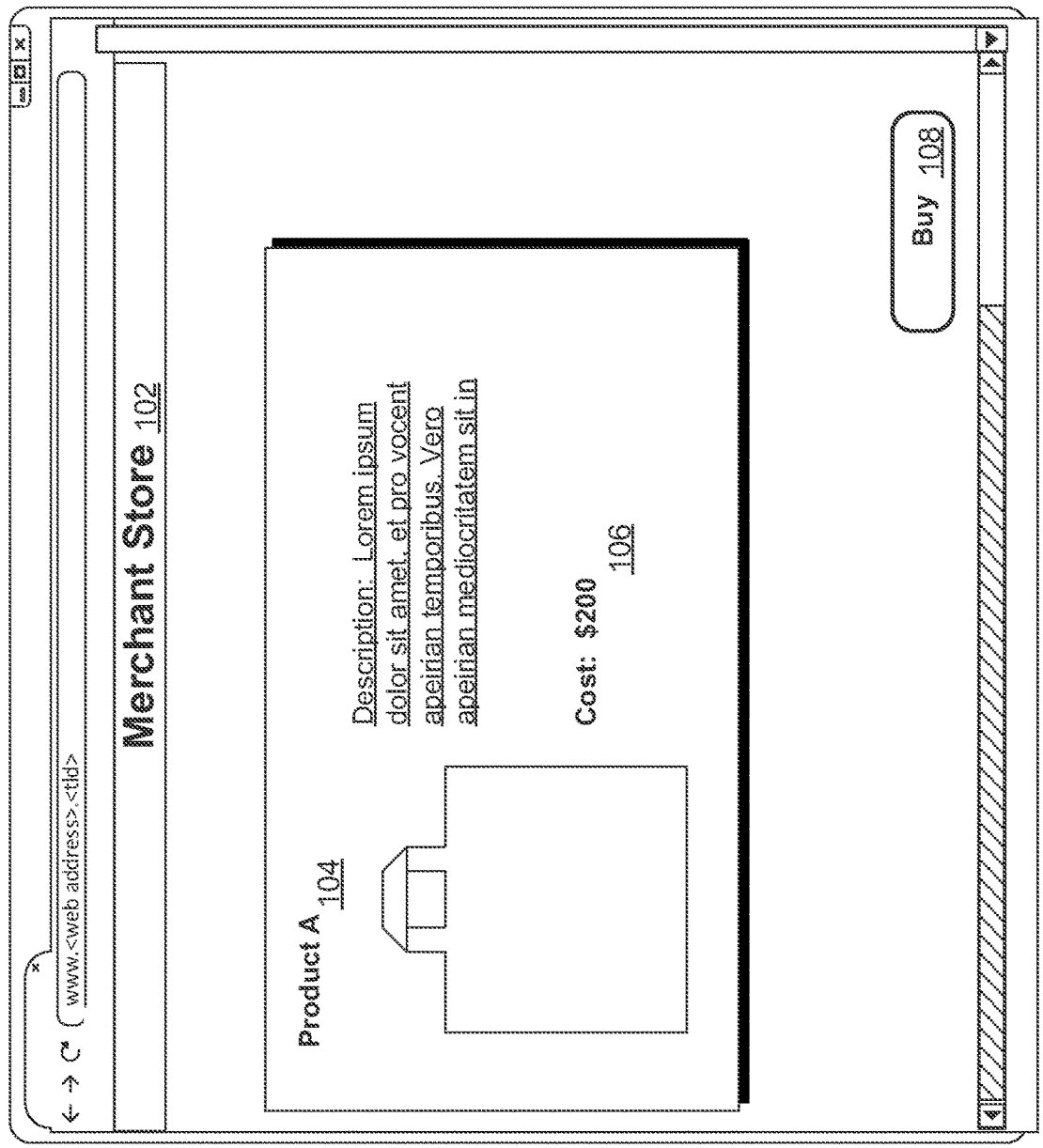
FIG. 1A illustrates an example user interface for purchasing a product associated with a merchant store.

This specification describes methods and systems for presenting a payment service, selected from multitudes of payment services, that a user prefers, or is likely to prefer, when purchasing products, goods, services, and so on, on merchant web pages. Merchants selling products can integrate (e.g., have a user account) with a described system, and can include executable code (e.g., a script), which can communicate with the described system, in web pages presented to users when purchasing products. The executable code can cause a user's preferred payment service (e.g., a payment service the user has historically most used when purchasing products from multiple merchants), which is also acceptable by the merchant, to automatically be displayed when a user is to purchase a product. In this way, merchants can personalize the presentation of payment services to their users, with each user being able to automatically see the presentation of their favorite (e.g., preferred) payment service. The system can automate this presentation process, enabling the merchant to make very minor alterations to their web pages (e.g., insert executable code), and creating a more personal environment for the user.

In this specification, a payment service is an electronic service that enables a consumer to provide, or confirm, payment (e.g., transfer of money, risk, credit) to another entity, such as a different consumer, a merchant, and so on, with payment being provided, or confirmed, using a system (e.g., a system not maintained or controlled by an entity, such as a merchant). Typically, payment services (e.g., systems, servers, and so on, associated with the payment service) maintain (e.g., store) payment instruments of consumers, such as credit card data, debit card data, and so on, and consumers typically have user accounts with each payment service. To pay for a product displayed on a merchant web page using a payment service, a user of the web page can select a displayed user interface object (e.g., a button), which upon selection, provides information to the payment service (e.g., to a system associated with the payment service) that the user is to purchase the product. The payment service can authenticate the user (e.g., use cookie data stored on a user device of the user, or prompt the user to enter an associated user name and password), and upon authentication can enable the safe transfer of money from the consumer to the merchant (e.g., the merchant can have authentication information, such as a merchant identifier, access code, password, and so on). In this specification, references made to providing, or receiving, information to, or from, a payment service can include providing, or receiving, information to, or from, a server, system, and so on, associated with (e.g., maintained by) the payment service (e.g., an entity that operates the payment service). Similar, references made to presenting a payment service to a user can include presenting a user interface element (e.g., an interactive user interface element) that can include an identifier of the payment service (e.g., a logo), and upon selection, or other interaction, with the user interface element, can cause the associated payment service to be accessed. For instance, upon selection the payment service can present user interface data to receive a user name and password associated with a user (e.g., described herein, with reference to FIG. 1D).

With the rise of products being purchased on the Internet, payment services have sprung forth to enable merchant web pages to provide a degree of assurance that their products can be safely purchased without sensitive payment information of consumers being improperly stored and maintained. Indeed, these payment services are unique to the computer network realm, and by using payment services separate from an internal merchant controlled payment service, small merchants no longer have to implement highly cost intensive network safety protocols.

However, due to the fragmentation of payment services, merchants might accept multiple payment services and include a dizzying array of choices for a consumer to use when purchasing a product. For instance, a merchant might display identifiers (e.g., logos) of a plethora of payment services, with each identifier selectable by a consumer to enable the consumer to complete a purchase transaction with the associated payment service. To increase a speed at which consumers can purchase a product (e.g., 'checkout' from an online store), this specification describes improvements to rapidly surface a payment service the user is known to prefer, or is likely to prefer. A merchant web page can therefore merely include an option to buy, purchase, or other preferred parlance, which a consumer can interact with, and upon interaction, the consumer's preferred payment service can automatically present itself to the consumer. The consumer can then interact with the preferred payment service (e.g., interact with a button that identifies itself as the preferred payment service), and the preferred payment service can complete the transaction.

As will be described, a system of one or more computers (e.g., the payment preference monitoring system 200) can maintain information describing payment services that a consumer has been determined, or is known, to utilize (e.g., have a user account with) across a multitude of merchant sites. Additionally, the system can maintain information describing payment services that merchants utilize. When purchasing a product on a merchant web page, the system can compare payment services, and automatically determine a preferred payment service, which is acceptable by the merchant associated with the merchant web page, for a purchasing consumer to utilize. The preferred payment service can be, in some implementations, a payment service the consumer is known to utilize at a greatest frequency across all merchant web pages within a threshold period of time (e.g., previous week, month, year, all time).

After determining a preferred payment service, the payment preference monitoring system can cause the presentation of the preferred payment service on a web page of the merchant (e.g., a user interface element that when selected, causes the preferred payment service to be accessed), enabling the consumer to purchase the product. Additionally, if the system does not have enough information to determine a preferred payment service of a consumer, the system can actively determine payment services that each of the consumer and the merchant is associated with (e.g., by querying different systems associated with payment services), and can select a preferred payment service as a payment service with which the consumer is associated, which the merchant can also accept.

In this way, the payment preference monitoring system can determine a payment service for a consumer utilizing a merchant web page, thus increasing the ease with which the consumer can purchase products. Additionally, by determining a preferred payment service for a consumer, the system can cause a merchant web page to utilize a payment service the consumer is likely already configured to use (e.g., a cookie is stored on a user device of the consumer). That is, based on empirically determined data of the consumer (e.g., monitoring past usage of payment services across merchant sites), the likelihood that the consumer has used that particular payment service, out of all the multitudes of payment services, in a recent time-period increases. Therefore, the consumer is more likely to be able to simply select an option to purchase a product, and if they are still logged into the determined preferred payment service, the preferred payment service can rapidly approve the purchase (e.g., a one-click purchase).

Merchants can perform an initial integration process with the system, such that the system can monitor payment service selections by users of the integrated merchants. The initial integration process can include the merchant registering (e.g., creating a user name and password) with the system, and indicating payment services the merchant offers. Additionally, the merchant can specify private information associated with each payment service, such as a user identifier, a password, an access code, a private key, and so on. When generating web pages on which users can purchase products, the merchant can include executable code associated with the system, which can cause the system to receive information indicative of the users viewing products, and can cause presentation of each user's preferred payment service. For instance, the system can cause the inclusion of code (e.g., HTML) associated with a preferred payment service in a web page, such that a button, or other user interface element, associated with the preferred payment service is rendered for presentation to the user. The system can utilize the private information to generate the code, such that the when it is included in the web page, the code is the same as would be included if the merchant had not integrated with the system. In some implementations, the payment preference monitoring system can cause the inclusion of code associated with a preferred payment service (e.g., code the payment service specifies to include in web pages of merchants), and the merchant can maintain code, configuration files, and so on (e.g., identifying private information), to cause the code to properly function as if the merchant had not integrated with the system.

Furthermore, the methods and systems described herein can solve problems that arise out of computer technology, networks, and so on. For instance, merchants no longer have to maintain and include code from multitudes of payment services in their web pages. Rather they can simply include a same executable code that can communicate with the payment preference monitoring system (e.g., using one or more application programming interface (API) calls), such that the executable code can cause the inclusion of the code from any of the multitudes of payment services. This necessarily reduces the size of web pages, enabling web pages to load faster, and reduces the merchants' need to create, store, and maintain, larger web pages. Additionally, this reduces the complexity for the merchant in having to navigate the complex landscape of making each payment service work with their web pages. This can include ensuring that code associated with each payment service is up to date, ensuring that their server systems can properly utilize the code (e.g., particular variables in the code might need to be encrypted by the merchant's server system, such as a password), and so on. Instead, the merchant can simply perform a one-time integration with the payment preference monitoring system, and provide private information provided by each payment service (e.g., user name, password, authentication token, private key, identifier), enabling the system to handle the rest (e.g., using executable code included in web pages of the merchant).

As described herein, the payment preference monitoring system can determine a preferred payment service of the user, or lacking information, can determine a preferred payment service of the merchant that the user can also utilize. The following includes a non-exhaustive description of possible situations that might arise in determining a payment service for the user to utilize.

User Prefers a Payment Service that the Merchant Offers

| User Payment Services (in order of preference) | Merchant Payment Services (in order of preference) | Determined Payment Service |
|---|---|---|
| Payment Service 1 | Payment Service 4 | Payment Service 1 |
| Payment Service 2 | Payment Service 2 | |
| Payment Service 3 | Payment Service 1 | |

As illustrated in the above table, the payment preference monitoring system can access information specifying payment services which the user can utilize, and payment services offered by the merchant. As shown, the user prefers "Payment Service 1," while the Merchant prefers "Payment Service 4." Since the merchant offers the user's most preferred payment service, "Payment Service 1," the system determines that the preferred payment service is "Payment Service 1." Determining a merchant's preferred payment service is described further herein.

User Prefers a Payment Service that the Merchant Offers, but User Requests a Different Payment Service In accordance with the above table, and as will be described further with respect to FIG. 1C, the user can select a different payment service than is determined by the system (e.g., "Payment Service 1"). The payment preference monitoring system can present alternative payment services which the user can utilize, and which the merchant offers. Therefore, in the situation illustrated in the above table, the system would present "Payment Service 2" as an additional option for the user to select, since that is the only remaining payment service that the user and Merchant share in common. Optionally, the payment preference monitoring system can present identifications of payment services offered by the Merchant, which the user cannot utilize (e.g., payment services with which the user does not have a user account, such as "Payment Service 4"). The user can then select from among the presented payment services, and servers associated with the selected payment service can enable the user to create a user account (e.g., the servers can provide one or more web pages associated with user account creation).

User is not Associated with any Payment Services Offered by Merchant

| User Payment Services (in order of preference) | Merchant Payment Services (in order of preference) | Determined Payment Service |
|---|---|---|
| Payment Service 1 | Payment Service 4 | Payment Service 4 |
| Payment Service 2 | Payment Service 5 | |
| Payment Service 3 | Payment Service 6 | |

The above table illustrates that in situations where the Merchant does not offer the use of any payment services that the user can utilize, the Merchant's most preferred payment service is determined (e.g., "Payment Service 4") by the payment preference monitoring system. In this case, the user will have to become associated with the Merchant's preferred payment service to pay for a desired product (e.g., the user will be required to create a user name/account with "Payment Service 4"). Optionally, identifications of other payment services offered by the Merchant can be presented to the user for selection, for example "Payment Service 5" and "Payment Service 6" can be presented.

System Lacks Information Specifying Payment Services of the User

| User Payment Services (System queries payment services) - No preference data | Merchant Payment Services (in order of preference) | Determined Payment Service |
|---|---|---|
| Payment Service 1; Payment Service 2; Payment Service 3 | Payment Service 4 | Payment Service 2 |
| | Payment Service 2 | |
| | Payment Service 3 | |

As will be described herein, in some situations the payment preference monitoring system might not have information associated with the user. For instance, the user may not have purchased a product from a merchant integrated with the system. In these situations, the system can query systems associated with a multitude of payment services to determine whether the user can utilize any of the payment services (e.g., the system can request from each system a response indicating whether the associated payment system has a user account of a user with a same phone number or e-mail address). As illustrated in the above table, the system has determined that the Merchant offers two payment services that the user can utilize (e.g., "Payment Service 2" and "Payment Service 3"). The system then identifies "Payment Service 2" as being the payment service that the user can utilize which is most preferable to the Merchant. Optionally, identifications of other payment services can be presented to the user (e.g., in addition to "Payment Service 2"), and the user can select from the other payment services the Merchant offers. For instance, identifications of "Payment Service 3" and "Payment Service 4" can be presented to the user for selection. Additionally, a designation can be placed near the presentation of the identifier of "Payment Service 3," indicating that the user has a user account with "Payment Service 3."

System Lacks Information Specifying Payment Services of the User, and the User is not Associated with any Payment Service Offered by the Merchant.

| User Payment Services (System queries payment services) - No preference data | Merchant Payment Services (in order of preference) | Determined Payment Service |
|---|---|---|
| Payment Service 1; Payment Service 2; Payment Service 3 | Payment Service 4 | Payment Service 4 |
| | Payment Service 5 | |
| | Payment Service 6 | |

In situations in which the payment preference monitoring system queries systems associated with payment services and determines that the user does not utilize any payment services the Merchant offers, the system may identify a most preferred payment service offered by the Merchant (e.g., "Payment Service 4") as the determined payment service. Optionally, identifications of other payment services offered by the Merchant can be presented to the user for selection. For example, identifications of "Payment Service 5" and "Payment Service 6" can be presented.

Additionally, the system can actively monitor any rebates, discounts, and so on, that a payment service might be offering, and can determine a payment service that provides the greatest discount.

FIG. 1A illustrates an example user interface 100 for purchasing a product 104 associated with a merchant store 102. The user interface 100 is an example of an interactive user interface presented on a user device of a user (e.g., a computer, a laptop, a tablet, a mobile device, or a wearable device) received from a content server associated with the merchant store 102. The user interfaces described in FIGS. 1A-1D can be presented by the user device upon rendering one or more content items (e.g., a web page) generated by the content server.

As illustrated, the user is viewing a product 104 (e.g., 'Product A') in the user interface 100. The user interface 100 includes an indication of the particular associated merchant (e.g., "Merchant Store 102"), which is available to access at a particular uniform resource locator (URL) (e.g., www.<web address>.<tld>). A description of the product 104, an image of the product, and an associated cost 106 of the product is presented (e.g., $200).

The user interface 100 includes a selectable option 108 to purchase the product 104 (e.g., "Buy"). Optionally, the example user interface 100 can include a selectable option to add to a list of products the user is to purchase (e.g., add to a 'cart'). As will be described herein, upon interaction with the selectable option 108, the content server associated with the merchant store 102 can provide information to a system (e.g., the payment preference monitoring system 200), and receive information describing a preferred payment service for the user to utilize.

Figure 1B:
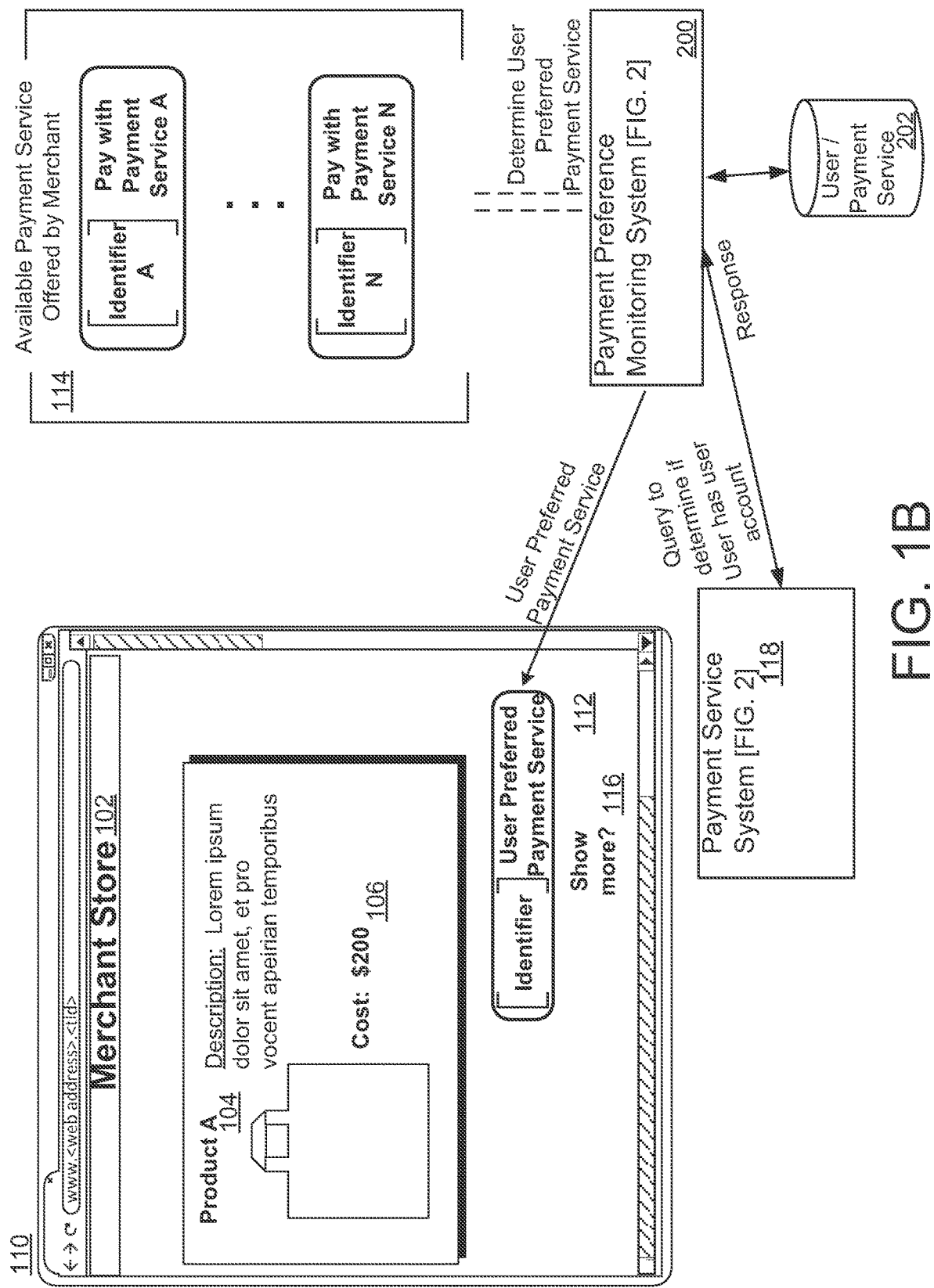
FIG. 1B illustrates an example user interface that includes a user preferred payment service.

FIG. 1B illustrates an example user interface 110 that includes a user preferred payment service 112. Upon selection of the selectable object 108 (e.g., "Buy" as described herein in FIG. 1A), the user interface 100 can update to include a user preferred payment service 112. This payment service 112 is seamlessly and automatically included in the user interface 110, hiding the workings from the user, and removing several steps to purchasing the product.

To determine the user preferred payment service, the payment preference monitoring system 200 identifies payment services that the user can utilize, and compares the identified payment services to payment services the merchant can utilize. As will be described, the payment preference monitoring system 200 obtains information indicative of the user, such as a phone number of the user, an e-mail address of the user, information associated with one or more user devices of the user, such as a device identifier (e.g., a device identifier included in an operating system of a mobile device displaying the user interface 110), a statistical ID (e.g., the user device can be identified based on value combinations of standard attributes associated with user devices, such as operating system, font, IP address, browser, location, and so on), a cookie associated with the merchant or associated with the payment preference monitoring system 200 (e.g., an HTTP cookie, an HTML5 cookie), and so on. The payment preference monitoring system 200 can then access maintained information identifying payment services the user can utilize (e.g., maintained in database 202).

To obtain information indicative of the user, the content item being presented on the user device can include executable code, scripts, and so on, which can obtain information indicative of the user, and directly provide it to the payment preference monitoring system 200. For example, the executable code can obtain identifying information, and through utilizing one or more application programming interface (API) calls associated with the payment preference monitoring system 200, can provide the identifying information to the system 200. In this way, the sensitive user information can be directly transmitted from the user device to the system 200, without the merchant server acting as a proxy. However, as described herein, a cookie associated with the merchant can be included on the user device. This cookie might only be accessible by the merchant server, and in some implementations the merchant server can identify the user from the cookie, and provide identifying information to the payment preference monitoring system 200. Optionally, the executable code can cause the user interface 110 to include an option for the user to enter one or more of the above identifying information, including entering an e-mail address or a phone number, and the entered information can be provided to the payment preference monitoring system 200. Optionally, the options for the user to enter identifying information can be included upon a failure of otherwise obtaining information indicative of the user.

After identifying the user, the payment preference monitoring system 200 can access maintained information identifying payment services of the user. As will be described, the payment preference monitoring system 200 can monitor payment services that the user has utilized in the past (e.g., stored in database 202), or the payment preference monitoring system 200 can actively query one or more systems associated with payment services to determine whether the user has an associated user account, and store information identifying payment services with which the user has associated user accounts (e.g., stored in database 202). For instance, the payment preference monitoring system 200 can utilize application programming interfaces (APIs) associated with each payment service to query whether the payment service has a user associated with the obtained information indicative of the user. As illustrated in FIG. 1B, the payment preference monitoring system 200 is querying a system 118 associated with a particular payment service, and has received a response indicating whether the particular payment service has information associated with the user.

The payment preference monitoring system 200 further obtains information identifying, or determines, payment services utilized by the merchant. As illustrated in FIG. 1B, the payment preference monitoring system 200 has identified Payment service A-Payment service N as payment services of the merchant 114. For instance, the content server associated with the merchant store 102 can store information identifying payment services (e.g., in a file, such as a configuration file which identifies payment services, along with associated information such as merchant identifiers, access codes, and so on), and can provide identifiers of the payment services to the system 200. Additionally as will be described, in some implementations the merchant can perform an integration process with the payment preference monitoring system 200, such that the payment preference monitoring system 200 can maintain information identifying payment services the merchant offers, along with information sufficient for the associated payment services to effect payment transfer to the merchant (e.g., a merchant identifier, a private access code, and so on).

To determine a user preferred payment service 112 to present in the user interface 110, the system 200 compares the payment services of the user to payment services of the merchant 114, and selects a payment service preferred by the user that is also utilized by the merchant 114. For instance, the user preferred payment service 112 can monitor payment services that the user utilizes the most (e.g., used the most frequently in a threshold period of time, or used most recently) across a plurality of merchants, or a payment service that the user prefers for the particular merchant store 102 (e.g. utilized the most in a threshold period of time, or used most recently), or a payment service that the user prefers for products similar to the product 104 (e.g., a same type of product, such as housewares, camping, sports, electronics, products of similar monetary value, and so on). Optionally, the system 200 can select a preferred payment service of the merchant over a preferred payment service of the user. Optionally, the system 200 can include an incentive for the user to utilize the preferred payment service of the merchant over the preferred payment service of the user (e.g., the user interface 110 can include textual information, "Use [Payment service N] for 5% off your order!").

In another instance in which the payment preference monitoring system 200 does not have access to information identifying a preferred payment service (e.g., the system 200 does not have information associated with the user, and has to query payment services to identify which payment services the user utilizes), the system 200 can select a preferred payment service of the merchant 114 as the user preferred payment service 112. The system 200 can store, or receive from the content server information identifying, preferred payment services of the merchant, and select a preferred payment service that the user can utilize. Alternatively, the system 200 can provide identifiers of payment services the user can utilize to the merchant, and the merchant can select a preferred payment service from the identifiers.

In another instance in which the payment preference monitoring system 200 determines that the user and the merchant do not utilize any payment services that overlap, the system 200 can select a preferred payment service of the merchant 114 as the user preferred payment service 112. The user can then create a user account with the preferred payment service of the merchant.

In this way, the payment preference monitoring system 200 can determine a user preferred payment service 112 to include in the user interface 110 as an interactive user interface element. The user preferred payment service 112 presented in the user interface 110 includes textual, or graphical, information identifying the payment service, along with an associated identifier (e.g., a logo). The payment preference monitoring system 200 can utilize the executable code included in the content item being presented on the user device to present the preferred payment service 112. In some implementations, the executable code can insert code (e.g., HTML code, JavaScript code, PHP, and so on) that is associated with the preferred payment service 112. That is, the system 200 can package code that is associated with the preferred payment service 112, which can include for instance, associated references (e.g., hyperlinks) that direct information (e.g., encrypted merchant identification information) to systems associated with the preferred payment service 112, and cause the presentation of user interface data associated with the preferred payment service 112 (e.g., a logo). As an example, without the merchant making use of the payment preference monitoring system 200, the merchant would need to include code (e.g., HTML code, executable code) in content items that is associated with the preferred payment service 112. Utilizing the payment preference monitoring system 200, the code associated with the preferred payment service 112 can be obtained and automatically inserted into the content item to complete the user's purchase. In this way, instead of the merchant being required to include executable code associated with a multitude of payment services, the merchant can merely include executable code associated with the system 200, and the system 200 can implement functionality to correctly present any of the multitude of payment services that the user prefers and/or the merchant offers. Optionally, the payment preference monitoring system 200 can provide information identifying the preferred payment service 112, and the merchant server can update the content item to include code associated with the payment service 112.

The user interface 110 further includes a selectable option 116 (e.g., "Show more?") for the user to select a different payment service than the preferred payment service 112 the system 200 selected. Upon selection of the selectable option 116, the user interface can present selectable options each associated with available payment services for the user to utilize.

Figure 1C:
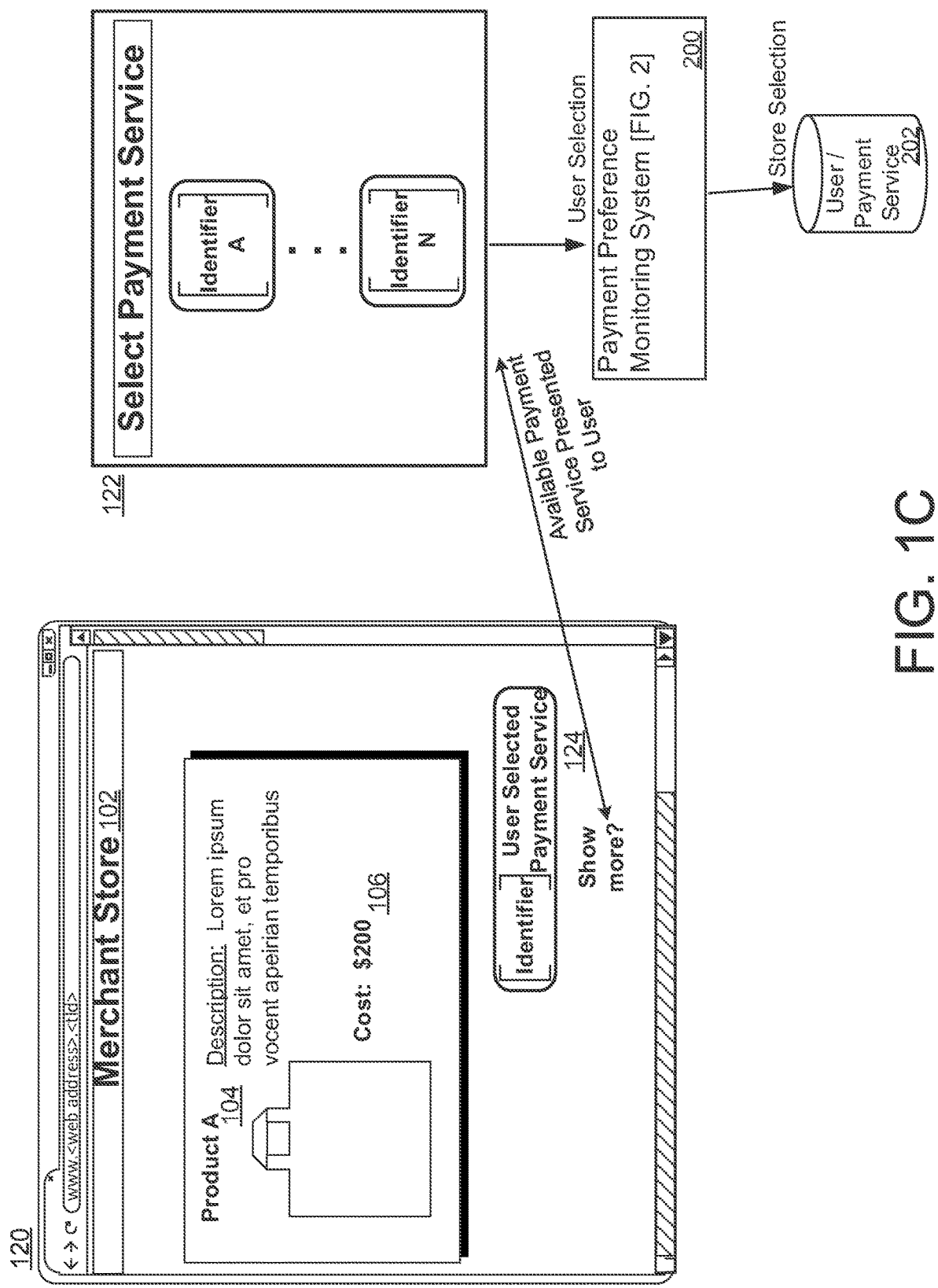
FIG. 1C illustrates an example user interface for selecting available payment services.

FIG. 1C illustrates an example user interface 120 for selecting available payment services 122. As described herein, the user of the user interface 110 can select a selectable option 116 to select a different payment service than the service determined by the payment preference monitoring system 200. Upon selection of the selectable option 116 (e.g., "Show more?"), a user interface to select payment services 122 is presented. The selectable payment services 122 can be included in the user interface 120 (e.g., the user interface 120 can update to include identifiers of payment services 122), or the selectable payment services 122 can be included in a separate user interface (e.g., a pop-up window displayed over the user interface 120 in a web browser).

The selectable payment services 122 include information identifying payment services that the user can utilize instead of the preferred payment service 112 determined by the payment preference monitoring system 200. The identified payment services can include payment services that the user utilizes (e.g., has access to) and which the merchant also utilizes. Alternatively, the identified payment services can include payment services that the merchant utilizes, and which the user can sign up for if he/she does not utilize one of the payment services.

As illustrated, the selectable payment services 122 is a user interface element (e.g., as described herein), which includes identifiers associated with available payment services. Optionally, textual data can be included identifying each payment service, and any rebates, coupons, and so on, which are being offered can be indicated (e.g., the system 200 can query systems associated with each payment service to determine whether it is offering such a rebate or coupon). Each identifier can be selected by the user (e.g., the user can select an identifier with a mouse, press a touch-sensitive screen, and so on), and upon selection the payment preference monitoring system 200 can receive the selection. The system 200 can then update a database 202 to indicate that the user prefers the selected payment service. Optionally, the database 202 can indicate that the user prefers the selected payment service for the particular merchant store 102 or for products similar to the product 104 (e.g., a same type, function, purpose, price range, and so on).

After selection of a payment service 122, the user interface 120 updates to present the user selected payment service 124 along with an associated identifier. The content server can receive information identifying the selection from the payment preference monitoring system 200 (e.g., the user interface associated with the selectable payment services 122 can be generated by the system 200 via the executable code), or the content server can receive the user interaction to determine a payment service that was selected.

Figure 1D:
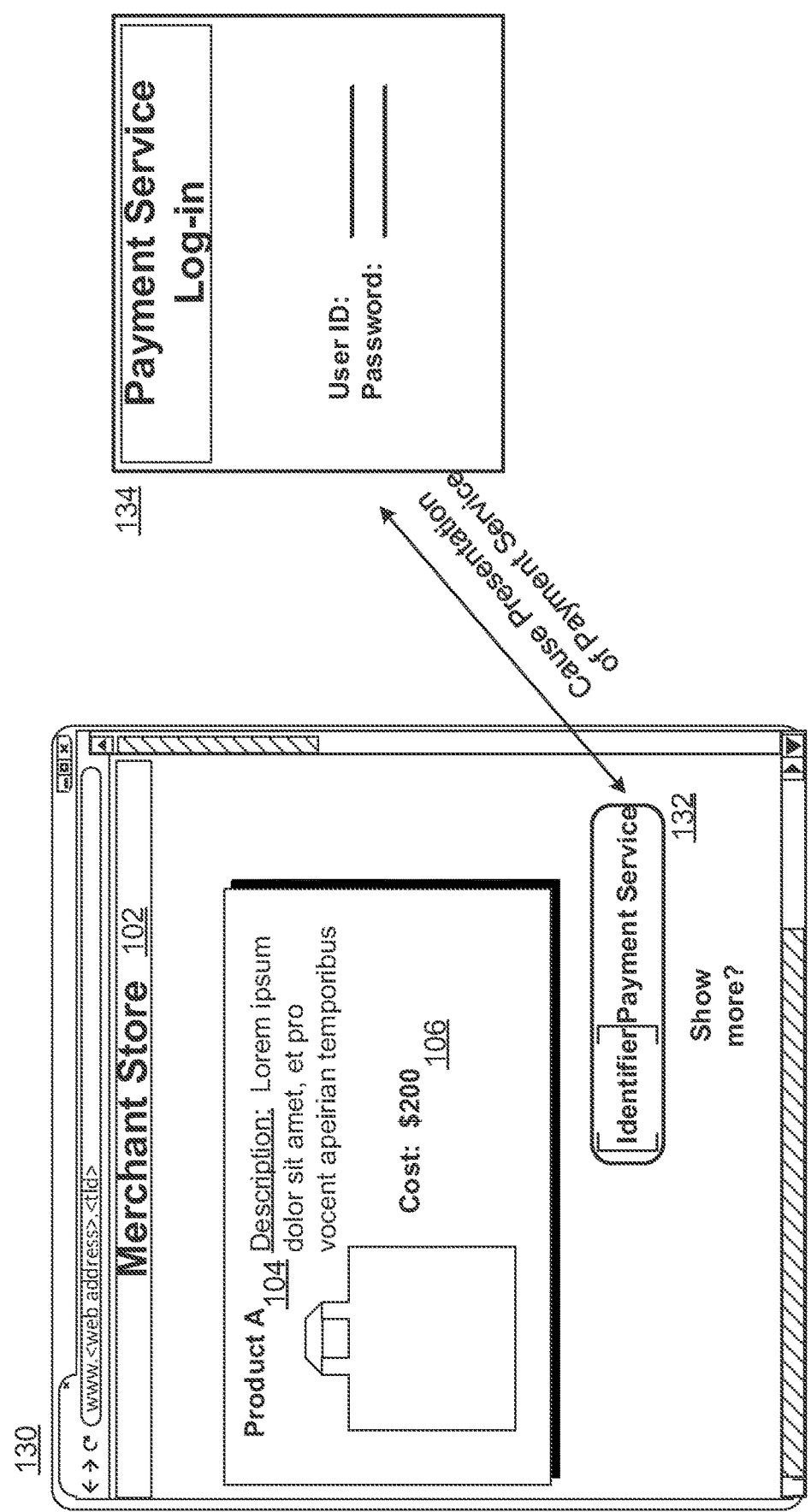
FIG. 1D illustrates an example user interface for accessing a selected payment service.

FIG. 1D illustrates an example user interface 130 for accessing a selected payment service 132. As described herein, with reference to FIGS. 1B-1C, user interface elements identifying a user preferred payment service 112 or user selected payment service 124 can be presented as a payment service 132 in FIG. 1D for the user to utilize. After the payment service 132 user interface element is presented, the user can interact with the payment service 132 to purchase the product 104.

Upon selection of the payment service 132, a server associated with the payment service can obtain information sufficient to enable payment transfer to the merchant (e.g., an identifier, an access code, an encrypted password), and the user device, or content server, can receive user interface data for the user to complete. For instance, upon selection, the server associated with the payment service can cause presentation of user interface data that includes selectable options for the user to complete for authentication purposes.

As illustrated, a user interface 134 associated with authenticating the user with the payment service 132 is presented to the user. The user interface 134 includes areas for the user to enter (e.g., type in, or otherwise enter, for instance on a touch-sensitive screen) a user name (e.g., "User ID") and password that are associated with a user account of the user. The user can then complete options that are associated with confirming, or providing, payment to the merchant. Optionally, if the user is already logged into the payment service (e.g., determined from cookie data), the user interface 134 can forego the authentication step, and confirm, or provide, payment to the merchant.

Figure 2:
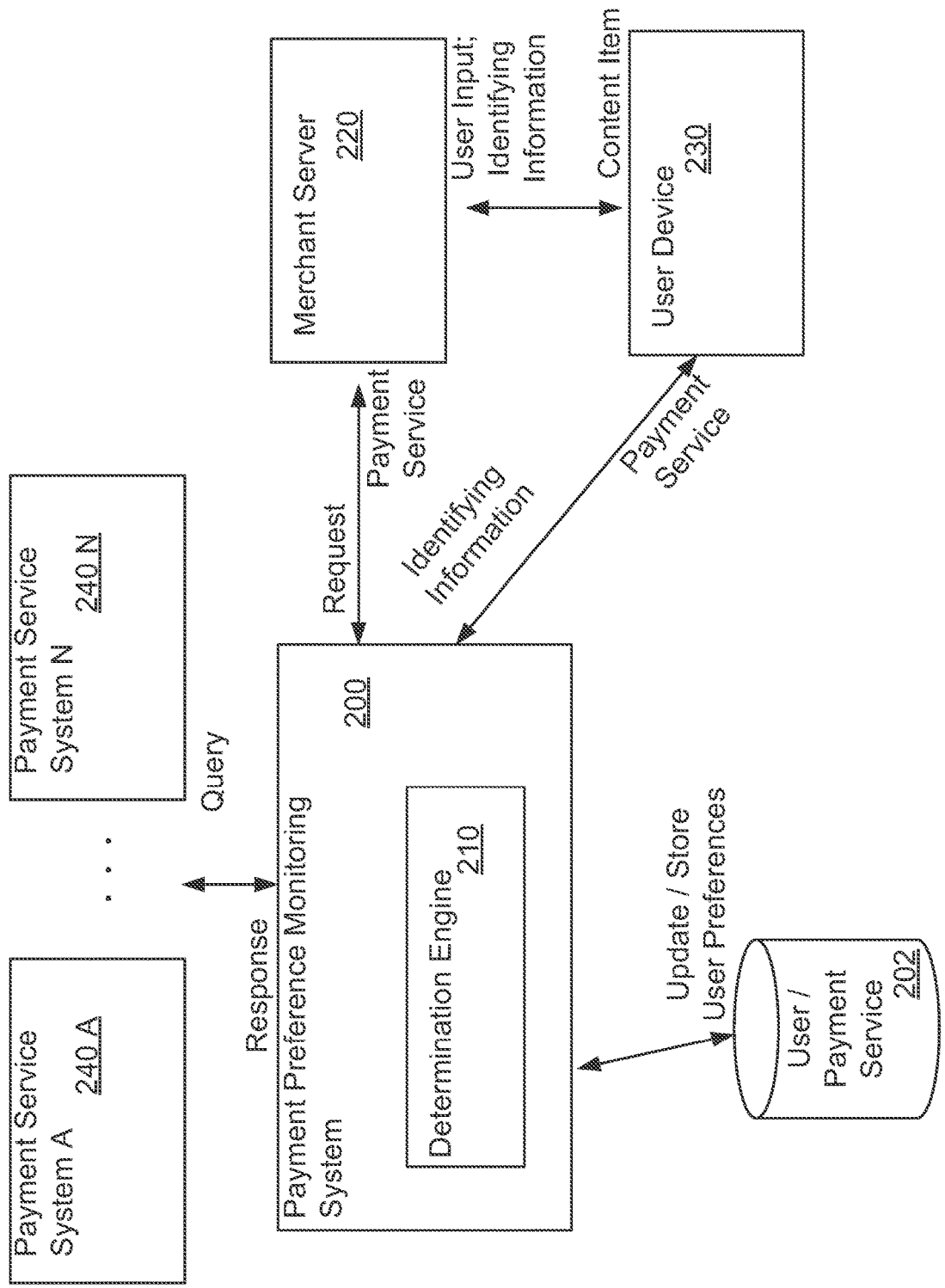
FIG. 2 is a block diagram of an example payment preference monitoring system in communication with a merchant server and user device of a user (e.g., consumer) interacting with the merchant server.

FIG. 2 is a block diagram of an example payment preference monitoring system 200 in communication with a merchant server 220 and user device 230 of a user (e.g., consumer) interacting with the merchant server 220. The payment preference monitoring system 200 can be a system of one or more computers that receives information from, and provides information to, the merchant server 220 and user device 230 over one or more networks (e.g., the Internet). The merchant server 220 can include executable code (e.g., a script) in a content item presented on the user device 230 of a user, which can receive information from the user to provide to the system 200, and can receive information (e.g., directly) from the system 200, for presentation to the user device 230. As described herein, the payment preference monitoring system 200 can determine a preferred payment service to be presented as a payment service on the user device 230.

The payment preference monitoring system 200 maintains information describing payment services that users (e.g., consumers) have utilized in the past, or can utilize (e.g., have user accounts with). The maintained information can be stored in one or more databases (e.g., user/payment service database 202), or the system 200 can be in communication with a storage subsystem that maintains the information in one or more databases. The database 202 can include structured data (e.g., identifications of payment services mapped, or otherwise associated with, identifiers of users) arranged in one or more relational or non-relational databases. Additionally, the database 202 can maintain information indicative of a preferred payment service for each user, which, as will be described herein, can be based on a frequency of use (e.g., within a threshold period of time) of payment services, and can vary (e.g., depend) on a particular merchant server 220 a user is purchasing a product from, a type of product being purchased, and so on. In all situations described herein in which private, sensitive, or any user information, is received and maintained, privacy protections can be implemented including anonymizing data, encrypting data, and providing capabilities for user opt-in/opt-out preferences.

The payment preference monitoring system 200 includes a determination engine 210 that receives information (e.g., a request) from a merchant (e.g., merchant server 220) that includes information indicative of a user interacting with the merchant server (e.g., interacting with a content item generated by the merchant server 220 for presentation on the user device 230). Optionally, the request can be received directly from the user device 230, for example in response to a user of the user device 230 interacting with a user interface element associated with executable code that directly provides information to the payment preference monitoring system 200 (e.g., using one or more API calls). For instance, the content item can include executable code that is associated with the payment preference monitoring system 200, with the executable code being operable to enable direct communications between the user device 230 and system 200. As described herein, to determine a preferred payment service of a user, the payment preference monitoring system 200 can obtain identifying information of the user, and can determine payment services, and a preferred payment service, for the user. Optionally, users can access one or more content items associated with the payment preference monitoring system 200, and can create user accounts that include identifying information of the users along with payment services the users utilize (e.g., the user can also indicate a ranking of payment services, including indicating a specific preferred payment service). In this way, if the user device 230 is configured to use the payment preference monitoring system 200 (e.g., a cookie associated with the payment preference monitoring system 200 is on a browser executing on the user device 230), the payment preference monitoring system 200 can identify a user account of the user, and obtain identifications of payment services.

To obtain information indicative of the user, the merchant server 220 can also request information from the user of the user device 230, including a telephone number of the user, an e-mail address of the user, and so on. For instance, the merchant server 220 can include, in the content item presented on the user device 230, user interface elements (e.g., text entry boxes) which can receive user input specifying identifying information. After receiving identifying information from the user, the merchant server 220 can provide the identifying information to the payment preference monitoring system 200. The payment preference monitoring system 200 can access the maintained information (e.g., in database 202), and identify a user that is associated with the identifying information. Optionally, the payment preference monitoring system 200 can directly receive the information entered by the user (e.g., executable code included in the content item can directly communicate with the payment preference monitoring system 200).

Additionally, to obtain information indicative of the user, the merchant server 220, or payment preference monitoring system 200, can obtain information associated with one or more user devices of the user (e.g., user device 230), such as a device identifier (e.g., a device identifier included in an operating system of a mobile device displaying the user interface 110), a statistical ID (e.g., the user device 230 can be identified based on value combinations of standard attributes associated with user devices, such as operating system, font, IP address, browser, location, and so on), a cookie (e.g., a HTTP cookie, a HTML5 cookie), and so on. The content item presented on the user device 230 can include executable code (e.g., scripts) that when executed, cause information associated with the user device 230 to be obtained. The payment preference monitoring system 200 can receive the identifying information, and access maintained information to identify an associated user.

Optionally, if the payment preference monitoring system 200 does not receive identifying information from the merchant server, or if the system 200 does not maintain information associated with the user (e.g., the system 200 has no record of an associated phone number, email address, user device information), the system 200 can determine one or more payment services of the user. The system 200 can query (e.g., provide requests) to one or more systems associated with payment services (e.g., Payment Service System A 240A-Payment Service System N 240N), to identify whether the payment services are associated with the user. For instance, the system 200 can utilize one or more application programming interfaces (APIs), content items (e.g., include identifying information in content items associated with the payment services), and so on, of the respective payment services, and can provide received identifying information to the payment services (e.g., to Payment Service System 240A). Upon a positive indication, the system 200 can update the database 202 to associate the indicated payment service with information identifying the user.

The payment preference monitoring system 200 includes a determination engine 210 that can determine a payment service to be utilized by the user (e.g., when purchasing a product displayed on the content item of the merchant server 220), which can also be accepted by the merchant (e.g., the merchant associated with the merchant server 220). To effect this determination, the determination engine 210 can obtain information identifying payment services accepted by the merchant, and compare the merchant accepted payment services to payment services utilized by the user. The payment preference monitoring system 200 can maintain information identifying payment services offered by the merchant, along with information sufficient to effect payment transfer to the merchant (e.g., account ID, access code, password, signature, and so on). For instance, each merchant associated with the payment preference monitoring system 200 can perform an initial integration process to specify payment services offered by the merchant, and can thereafter merely include executable code associated with the system 200 in content items (e.g., as described herein in FIGS. 1A-1D). That is, the merchant can access one or more content items associated with the payment preference monitoring system 200 to indicate payment services they can accept as an initial integration with the system 200, and can update the payment services as needed by accessing the content items.

Optionally, the merchant server 220 can include identifications of payment services in the request to the system 200, or the system can provide a request to the merchant server 220 for payment services. For instance, the merchant server 220 can maintain information (e.g., a configuration file) identifying payment services, and can provide the payment services for each request. The payment preference monitoring system 200 can update the database 202 periodically (e.g., the system 200 can request payment services of the merchant after a periodic number of requests received from the merchant, or a periodic amount of time). Optionally, merchants associated with the payment preference monitoring system 200 can, as described herein, store information identifying payment services they can accept (e.g., in a configuration file). When a content item is presented on a user device 230 of the user, the content item can include executable code (e.g., a script) associated with the system 200 that can access the configuration file, and provide the identifications of payment services to the payment preference monitoring system 200 (e.g., the identifications can be encrypted).

After identifying payment services of the merchant, the determination engine 210 can select a payment service preferred by the user that is accepted by the merchant. The determination engine 210 can maintain, and access, information identifying a frequency of use of each payment service (e.g., within a threshold period of time), and can determine a payment service the user historically prefers, or has preferred in a recent threshold period of time. The determination engine 210 can then select the payment service most preferred by the user (e.g., used at a highest frequency) that is acceptable by the merchant. After selecting the preferred payment service, the determination engine 210 can include code (e.g., HTML code, executable code) associated with the preferred payment service in a content item being presented on the user device.

In some implementations, the determination engine 210 can provide an indication of the preferred payment service to the merchant server 220. In these implementations, the merchant server 220 can cause the presentation of the preferred payment service (e.g., the merchant server 220 can include code associated with the preferred payment service in the content item). Additionally, as described herein the determination engine 210 can cause the presentation of information associated with the preferred payment service on the user device 230. For example, executable code included in a content item presented on the user device 230 can receive code (e.g., HTML, JavaScript, and so on, code associated with the preferred payment service that can present a selectable object, such as a button, on the user device, and upon selection of the object can provide information to, and receive information from, servers associated with the preferred payment service), and present (e.g., render) the received code.

For situations in which there is no overlap between payment services of the user, and payment services accepted by the merchant, the determination engine 210 can select the preferred payment service as a payment service accepted by the merchant. Similar to the above, the determination engine 210 can determine a preferred payment service of the merchant, such as a payment service that has been indicated by the merchant as being preferred (e.g., indicated in a configuration file, such as by an ordered or ranked list of acceptable payment services).

For situations in which there is overlap between payment services of the user and payment services accepted by the merchant, but the determination engine 210 does not have information identifying a preferred payment service of the user, the determination 210 can select a payment service utilized by the user that is preferred by the merchant.

After determining a preferred payment service, the merchant server, or system 200, can present, and/or cause presentation of, the payment service in the content item on the user device 230 (e.g., present an identifier of the preferred payment service and user interface element configured to complete the transaction using one or more servers associated with the preferred payment service). As described herein, with reference to FIG. 1C, the user can select an option to select a different payment service. The determination engine 210 can then obtain information identifying all payment services of the user (e.g., that are also acceptable to the merchant), and the merchant server 220, or system 200 utilizing included executable code, can present the identified payment services for presentation to the user (e.g., for selection). Optionally, the merchant server 220, or system 200, can present information identifying all payment services the merchant accepts, or the user can provide information identifying a particular payment service, and the merchant server 220 can confirm or deny that it accepts the payment service.

The determination engine 210 can receive a payment service the user selected, and update the database 202 to associate the payment service with the user. Additionally, the determination engine 210 can provide a weighting to the selected payment service, with the weighting indicating a likelihood that the user will prefer a payment service. In this way, the determination engine 210 can determine that the selection represents a trend associated with the user's preferences, and can thus over time (e.g., one or more times in which the user selects the selected payment service) determine that the selected payment service is the preferred payment service.

Figure 3:
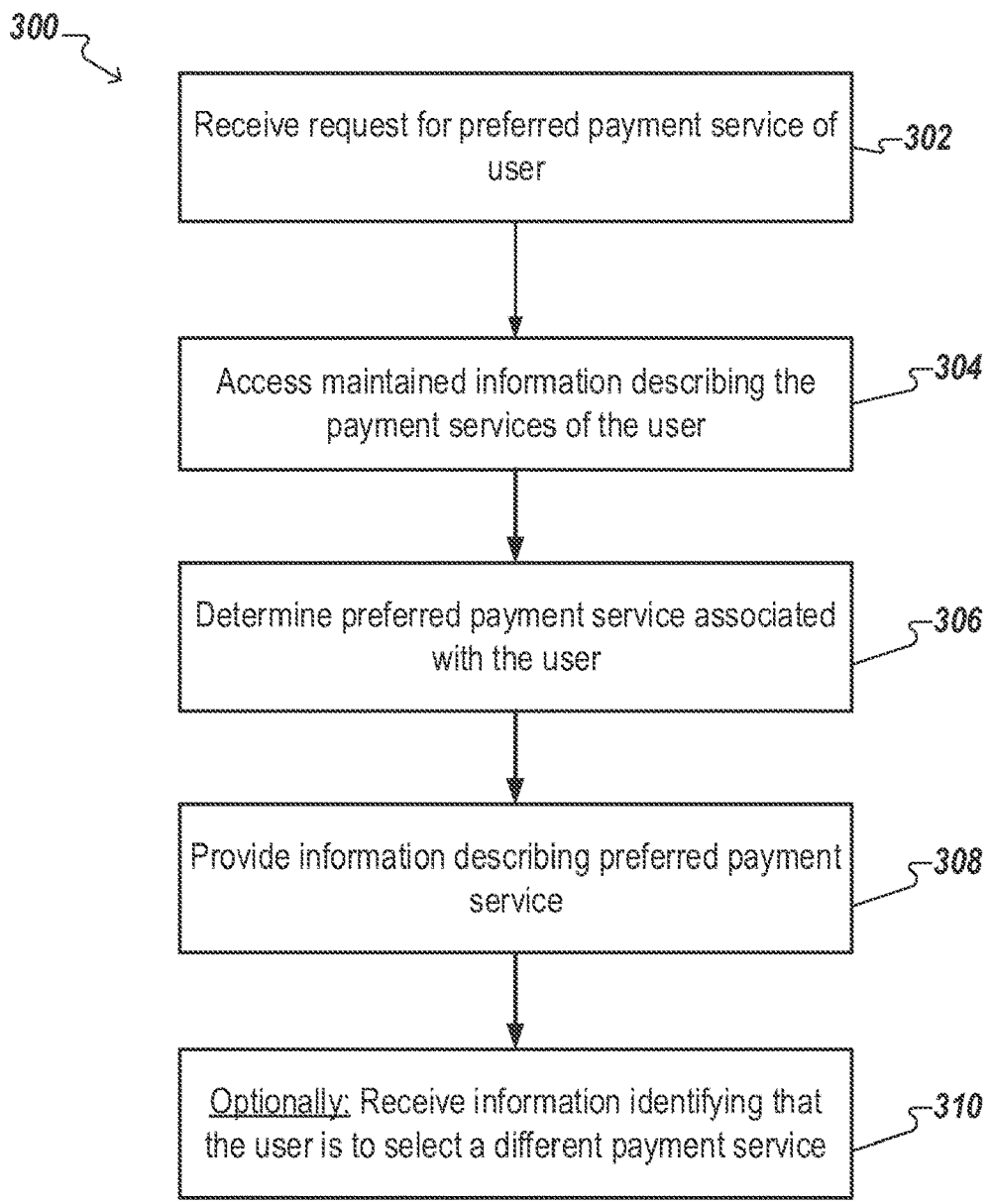
FIG. 3 is a flowchart of an example process for determining a preferred payment service of a user interacting with a content item associated with a merchant.

FIG. 3 is a flowchart of an example process 300 for determining a preferred payment service of a user interacting with a content item associated with a merchant. For convenience, the process 300 will be described as being performed by a system of one or more computers (e.g., the payment preference monitoring system 200).

The system receives a request for a preferred payment service to present to a user who is interacting with a content item associated with the merchant (block 302). As described herein, a user of a user device (e.g., a consumer viewing a product for purchase) can receive a content item from a content server (e.g., the merchant server 220) associated with a merchant, and interact with the content item to view products available from the merchant, purchase products, and so on. The content server can include executable code (e.g., a script, HTML, Java, and so on) in the content item (e.g., for execution, rendering, and so on, by the user device) which is associated with the system. The user can interact with the content item (e.g., select a purchase button in the content item), and the executable code can provide the request to the system. As described herein, the request can be provided directly from the user device, or the request can be received by the content server, and provided to the system.

The request includes information indicative of the user interacting with the content item. For instance, as described herein, the user can enter (e.g., in the content item) identifying information, including an e-mail address, a phone number, a user name, a name, an address, and so on. Furthermore, the user can be presently logged into the content server, and the content server can provide user identifying information to the system, including phone number, name, and so on.

The system accesses maintained information describing payment services of users, and identifies payment services of the user (block 304). Utilizing the information indicative of the user received in the request, the system accesses maintained information (e.g., as described in FIG. 2 herein), and identifies payment services of the user. For instance, the system can compare a received phone number to phone numbers stored in the maintained information, and can identify a match. As another example, the system can compare a received name to names stored in the maintained information, and can identify a match. If there are multiple names that match, the system can utilize other data to infer which stored name entry corresponds to the user. As an example, the system can utilize one or more of a location of the user (e.g., from an IP address), information associated with the user's user device, phone number, email address, and so on, to identify a match.

As described herein, the system may not store information associated with the user, for instance the user may not have previously interacted with a merchant that has integrated with the system, and the system may be unable to identify payment services of the user. In this situation, the system can query servers associated with payment services, and receive responses indicating whether the payment service is associated with the user. As the system receives positive responses, the system updates the maintained information to identify payment services of the user.

The system determines a preferred payment service associated with the user (block 306). The system can also obtain information identifying payment services the merchant associated with the content server can accept (e.g., as described herein in FIG. 2), and determines a preferred payment service to be presented to the user (e.g., in the content item).

The system monitors payment services that the user utilizes, for instance in prior purchases of products with merchants. The system can monitor a number of times each payment service was utilized, including which payment services have seen a recent uptick in usage (e.g., with a threshold amount of time). Using this monitored information, the system can select the preferred payment service as a payment service utilized the most (e.g., within a threshold period of time) out of payment services the merchant can accept. Furthermore, the system can obtain information identifying payment services the user selected instead of a preferred payment service the system determined. As will be described herein, and as illustrated in FIG. 1C, the user can request a different payment service than the payment service automatically determined for the user. For a subsequent purchase, the system can select the payment service the user selected as the preferred payment service. Optionally, the system can determine that if the user requests to select a new payment service, after being presented with a determined preferred payment service, and selects a particular payment service a threshold number of times (e.g., in a threshold period of time), that the selected payment service is to be the preferred payment service (e.g., even if the selected payment service has been used with less frequency than other payment services, for instance used with less frequency within a threshold period of time).

Optionally, the system can calculate and monitor statistics of user behavior, including a frequency with which each payment service is used, and whether the user selected a different payment service from the payment service the system initially determined, along with characteristics of the product being purchased, the merchant from whom the product was purchased, time of day, user device utilized by the user, location from which the user made the purchase, and so on. Using the above features, the system can generate one or more machine learning models that determine a preferred payment service given features of the present request. For instance, the system can cluster the features according to a clustering process (e.g., k-means clustering), and can determine based on received features, a particular payment service that best comports with the user's behavior. For example, the system can determine that for a particular type of product (e.g., sports, housewares, jewelry, automotive parts, clothing), a particular payment service is preferred by the user.

The content server associated with the merchant, or the user device, can provide information to the system identifying the product, or multiple products, the user is to purchase, including a type of product, a price of the product, and so on. The system can access the maintained information, and determine a payment service that the user is likely to prefer, given features of the product (e.g., type, price), and other features the system has access to, including as described herein, a location of the user, a time of day, a particular user device, and so on. For instance, the system might determine that, for a given user device associated with the user (e.g., determined based on an identifier, MAC address, statistical information), the user prefers to use a particular payment service. For example, the user may already be authenticated to this payment service (e.g., logged in), and not have to enter user account details (e.g., user name, password), and so may prefer the ease of use of the payment service. Alternatively, a different user device of the user may have a different preference associated with it, as the user may not be logged into the same payment service, or the user might clear stored cookies more frequently, and therefore the user may have to log into a payment service for each payment.

Additionally, the system may determine that for a given price range, the user prefers a particular payment service (e.g., a high limit credit card may be associated with the particular payment service, the particular payment service may offer rewards, rebates, cash-back, and so on). Similarly, the system may determine that while the user is away from home (e.g., on vacation, determined based on maintained location information of the user devices of the user, for instance based on an IP address), the user prefers to use a particular payment service. In this way, the system can utilize the above features to select a preferred payment service of the user.

As described herein, if the user does not use payment services that the merchant uses, the system can select a preferred payment service of the merchant. Additionally, if the system does not have maintained information, or sufficient maintained information, to determine a preferred payment service of the user, the system can select a preferred payment service of the merchant.

The system provides information identifying the preferred payment service of the user (e.g., block 308). The system provides an indication of the preferred payment service to the user, which can include providing the indication directly to the user device (e.g., the content item can receive the indication from the system, and executable code associated with the system can cause presentation of user interface elements associated with the preferred payment service) or providing the indication to the content server. As described herein, the information can include an identifier (e.g., logo) of the preferred payment service, executable or markup code associated with the preferred payment service (e.g., the executable code can be included in the content item, and the user can interact with it to effect payment transfer to the merchant), a reference to the preferred payment service (e.g., a hyperlink associated with accessing the preferred payment service), and so on.

The system optionally receives information identifying that the user is to select a different payment service (block 310). As illustrated in FIG. 1C, the user can select a selectable option to view additional payment services that are available (e.g., payment services of the user that the merchant accepts, or any other payment services that the merchant accepts). The system obtains identifications of other payment services, and provides the identifications to the user.

Optionally, the system can order, or assign a ranking, to each payment service, and the content item on the user device of the user can present the payment services according to the order, or ranking. For instance, the system can utilize frequencies of use of each available payment service, one or more machine learnings models as described herein, and can assign a ranking, or assign an order, to each payment service. In this way the user can rapidly select a payment service without scanning through the entirety of the list.

Alternative Embodiment

As described herein, the system obtains information indicative of a user to, in part, determine a preferred payment service of the user. In some implementations, a merchant can integrate with the system and cause presentation of a particular preferred payment service of a user utilizing an electronic application (e.g., a mobile "app" associated with the merchant) executing on a user device of the user. For instance, the system can receive information indicative of the user, and determine a preferred payment service for the user (e.g., as described herein).

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

The various features and processes described herein may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y or Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y or at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated herein, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method comprising:
    by a system of one or more computers,
        monitoring payment services selected by users across a plurality of merchant sites, wherein the monitoring includes monitoring user selections associated with each of a plurality of payment services;
        maintaining payment service preference data for a user indicating payment services selected by the user across at least a subset of the plurality of merchant sites, the payment preference data obtained by monitoring payment services selected by the user across at least the subset of the plurality of merchant sites, wherein each payment service effects payment transfer between users and merchants outside of systems controlled by the merchants;
        receiving a request from a content server associated with a merchant for a preferred payment service of the user, the content server providing a content item presented via a user device of a user and receiving data specifying user interactions from the user indicating the user is to purchase one or more products offered by the merchant, and the content item comprising executable code configured for secure communication with the system, wherein the request does not specify which of the plurality of payment services to use for the purchase of the one or more products offered by the merchant,
        wherein the request is provided via the executable code and includes information indicative of the user;
        accessing the maintained payment service preference data, and determining, based at least in part on the information included in the request and the maintained payment service preference data, one or more payment services, from the plurality of payment services, that are associated with the user;
        determining, from the identified payment services, a preferred payment service of the user, the preferred payment service selected by the system from the plurality of payment services and being acceptable by the merchant; and
        sending an indication to one of the user device or the content server to automatically update, via the executable code, the content item to form an updated content item that enables the user to access the preferred payment service to effectuate payment transfer to the merchant, wherein the executable code, based on receipt of the indication, causes code associated with the preferred payment service to be included in the updated content item, the included code causing presentation of a user interface element associated with the preferred payment service that, upon selection by the user, enables the user to approve purchase of the one or more products from the merchant using the preferred payment service.

2. The method of claim 1, wherein the information indicative of the user comprises an e-mail address associated with the user, or a phone number associated with the user.

3. The method of claim 1, wherein the information indicative of the user is obtained from one of (a) the user via the content item or (b) information associated with the user device of the user, wherein the information associated with the user device comprises at least one of a device identifier or statistical information of the user device.

4. The method of claim 1, wherein the maintained payment service preference data includes, for the user, a frequency with which the user accesses associated payment services in a threshold period of time.

5. The method of claim 4, wherein determining a preferred payment service comprises:
   determining a payment service, of the identified payment services, associated with a highest frequency of use by the user.

6. A method comprising:
   by a system of one or more computers,
      monitoring payment services selected by users from among a plurality of payment services;
      receiving, in association with a potential payment transfer to an entity, a request for a preferred payment service of a user viewing a content item presented via a user device, the content item generated by a content server associated with the entity, and the content item comprising executable code configured for secure communication with the system, wherein the request does not specify which of the plurality of payment services to use for the potential payment transfer to the entity,
      wherein the request is provided via the executable code and includes information indicative of the user, and wherein a payment service effects payment transfer between users and entities outside of systems controlled by the entities;
      accessing selection information associated with payment services that have been selected by the user across a plurality of content items associated with entities that have integrated with the system, wherein the system monitors payment service selections of the user across the plurality of content items;
      determining, based at least in part on the selection information and information identifying payment services accepted by the entity, the preferred payment service of the user, wherein the preferred payment service is selected by the system from among the plurality of payment services; and
      sending an indication to the user device to automatically update, via the executable code, the content item to form an updated content item that enables the user to access the preferred payment service,
      wherein the executable code, based on receipt by the user device of the indication, causes code associated with the preferred payment service to be included in the updated content item, the included code causing presentation of a user interface element associated with the preferred payment service by the user device that, upon selection by the user, enables the user to approve payment transfer from the preferred payment service to the entity.

7. The method of claim 6, wherein the information indicative of the user comprises an e-mail address associated with the user, or a phone number associated with the user.

8. The method of claim 6, wherein the information indicative of the user is obtained from one of (a) the user via the content item or (b) information associated with the user device of the user, wherein the information associated with the user device comprises at least one of a device identifier or statistical information of the user device.

9. The method of claim 6, wherein determining the preferred payment service comprises:
   identifying, from the selection information, payment services associated with the user which are accepted by the entity, one or more of the identified payment services being associated with information identifying a frequency of use by the user; and
   identifying the preferred payment service as a payment service associated with a highest frequency of use by the user.

10. The method of claim 6, wherein the selection information further includes, for a particular payment service, information identifying that the particular payment service was selected by the user over a preferred payment service determined by the system in response to a prior received request, and
    wherein determining the preferred payment service comprises assigning the particular payment service as the preferred payment service.

11. The method of claim 6, further comprising:
    receiving information identifying that the user is to select a payment service different from the preferred payment service;
    causing presentation, via the user device, of indications of payment services available for the user to select; and
    receiving information identifying a selected payment service.

12. The method of claim 11 further comprising:
    updating the selection information associated with the selected payment service of the user.

13. A system of one or more computers and one or more computer storage media storing instructions that when executed by the one or more computers, cause the one or more computers to perform operations comprising:
    monitoring payment services selected by users from among a plurality of payment services;
    receiving, in association with a potential payment transfer to an entity, a request for a preferred payment service of a user viewing a content item presented via a user device, the content item generated by a content server associated with the entity, and the content item comprising executable code configured for secure communication with the system, wherein the request does not specify which of the plurality of payment services to use for the potential payment transfer to the entity,
    wherein the request is provided via the executable code and includes information indicative of the user, and wherein a payment service effects payment transfer between users and entities outside of systems controlled by the entities;
    accessing selection information associated with payment services that have been selected by the user across a plurality of content items associated with entities that have integrated with the system, wherein the system monitors payment service selections of the user across the plurality of content items;

determining, based at least in part on the selection information and information identifying payment services accepted by the entity, the preferred payment service of the user, wherein the preferred payment service is selected by the system from among the plurality of payment services; and sending an indication to the user device to automatically update, via the executable code, the content item to form an updated content item that enables the user to access the preferred payment service, wherein the executable code, based on receipt by the user device of the indication, causes code associated with the preferred payment service to be included in the updated content item, the included code causing presentation of a user interface element associated with the preferred payment service by the user device that, upon selection by the user, enables the user to approve payment transfer from the preferred payment service to the entity.

14. The system of claim 13, wherein the information indicative of the user comprises an e-mail address associated with the user, or a phone number associated with the user.

15. The system of claim 13, wherein the information indicative of the user is obtained from one of (a) the user via the content item or (b) information associated with the user device of the user, wherein the information associated with the user device comprises at least one of a device identifier or statistical information of the user device.

16. The system of claim 13, wherein determining the preferred payment service comprises:

identifying, from preference information, payment services associated with the user which are accepted by the entity, one or more of the identified payment services being associated with information identifying a frequency of use by the user; and identifying the preferred payment service as a payment service associated with a highest frequency of use by the user.

17. The system of claim 13, wherein the preference information further includes, for a particular payment service, information identifying that the particular payment service was selected by the user over a preferred payment service determined by the system in response to a prior received request, and wherein determining the preferred payment service comprises assigning the particular payment service as the preferred payment service.

18. The system of claim 13, wherein the operations further comprise:

receiving information identifying that the user is to select a payment service different from the preferred payment service;

causing presentation, via the user device, of indications of payment services available for the user to select; and receiving information identifying a selected payment service.

19. The system of claim 18, wherein the operations further comprise:

updating payment preference information associated with the selected payment service of the user.

20. The method of claim 6, wherein the preferred payment service is selected based at least in part on a determination that a browser operating on the user device is likely to be configured, prior to the generation of the content item, with a cookie associated with the preferred payment service.

\* \* \* \* \*